Aug. 3, 1965 G. H. LEONARD 3,198,165
ANGULAR POSITION INDICATOR FOR ROTATABLE ELEMENT
Filed July 9, 1962 3 Sheets-Sheet 1
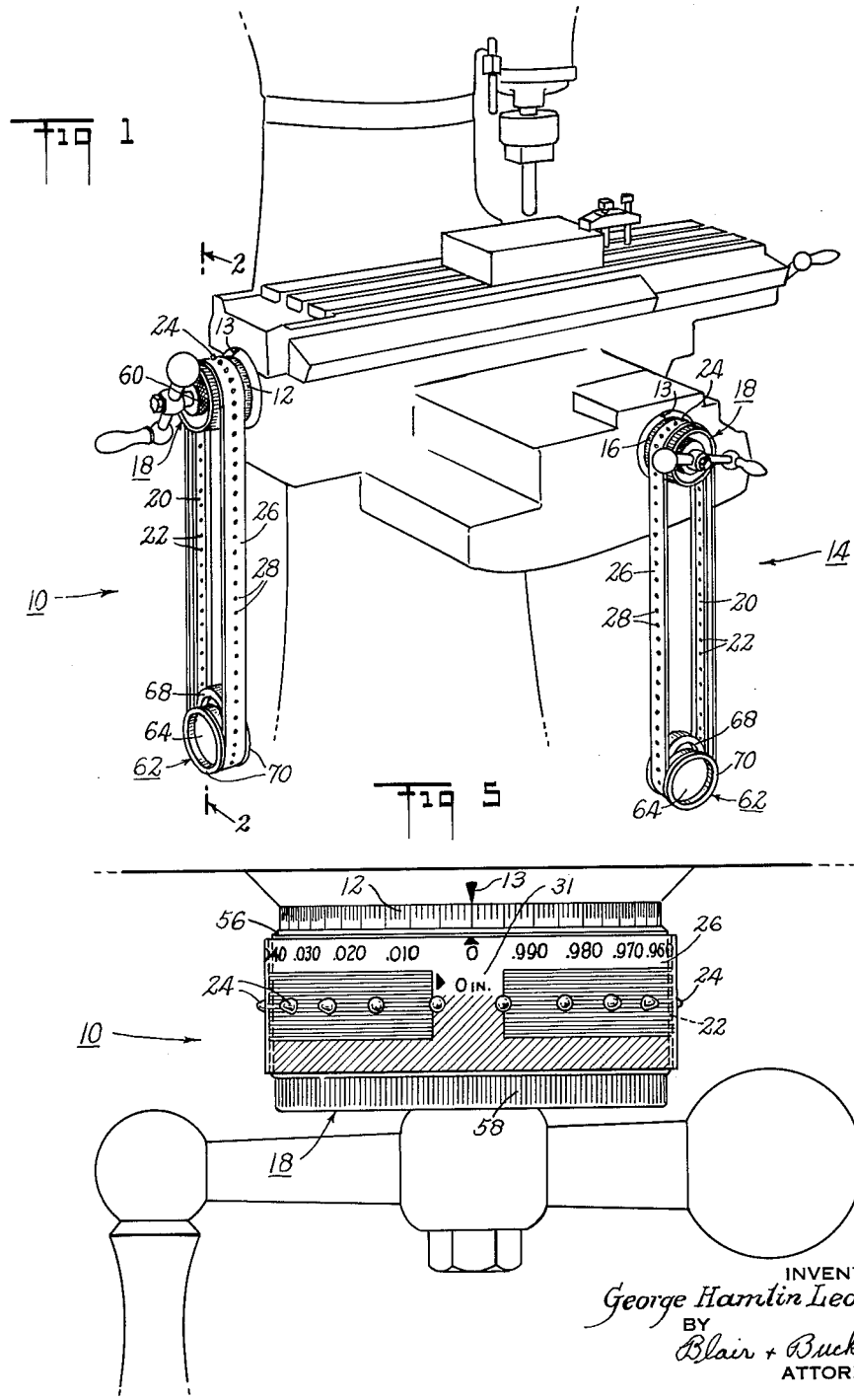
INVENTOR
George Hamlin Leonard
BY
Blair + Buckles
ATTORNEYS Aug. 3, 1965   G. H. LEONARD   3,198,165
ANGULAR POSITION INDICATOR FOR ROTATABLE ELEMENT
Filed July 9, 1962   3 Sheets-Sheet 2
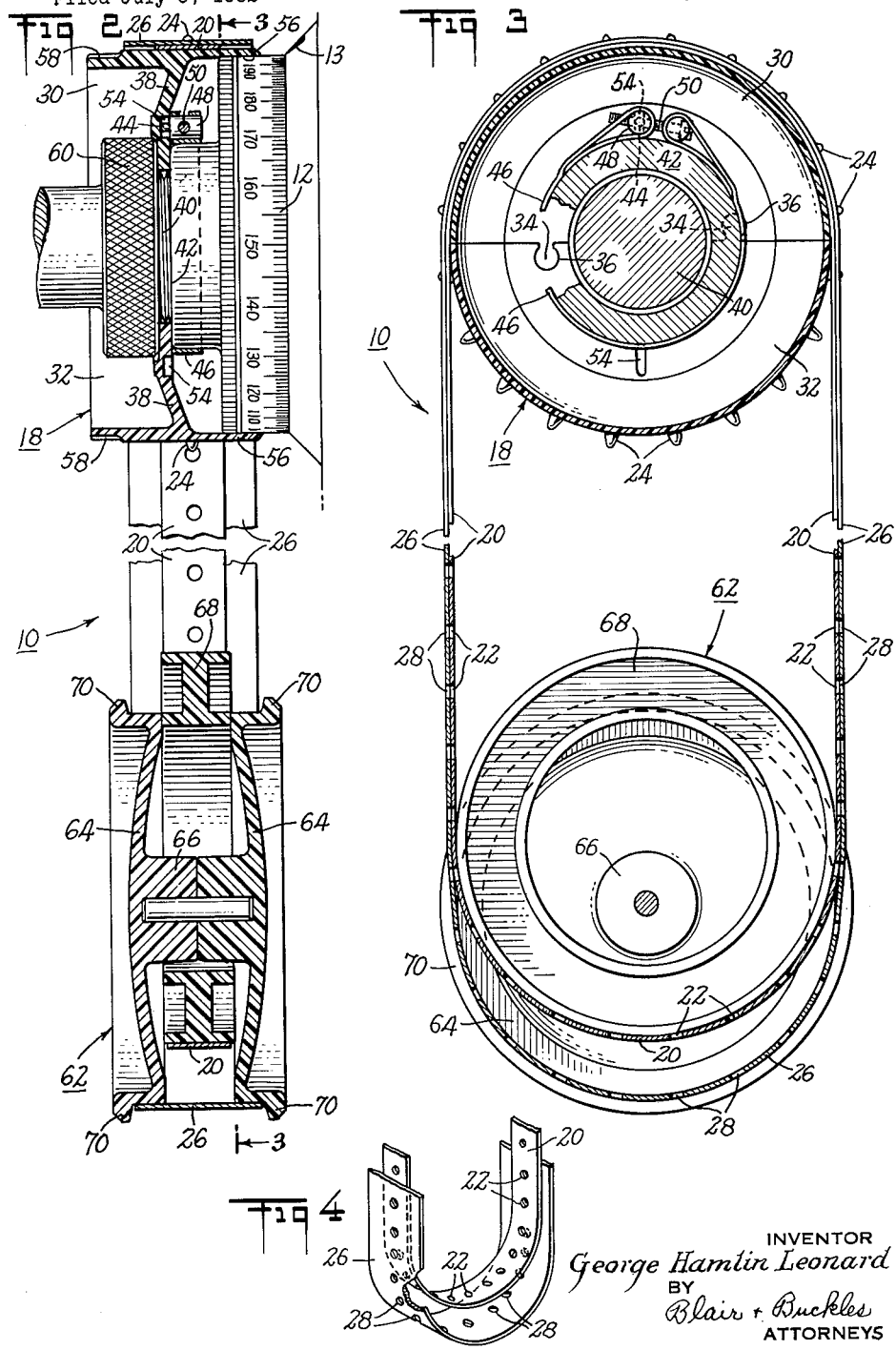
INVENTOR
George Hamlin Leonard
BY
Blair + Buckles
ATTORNEYS

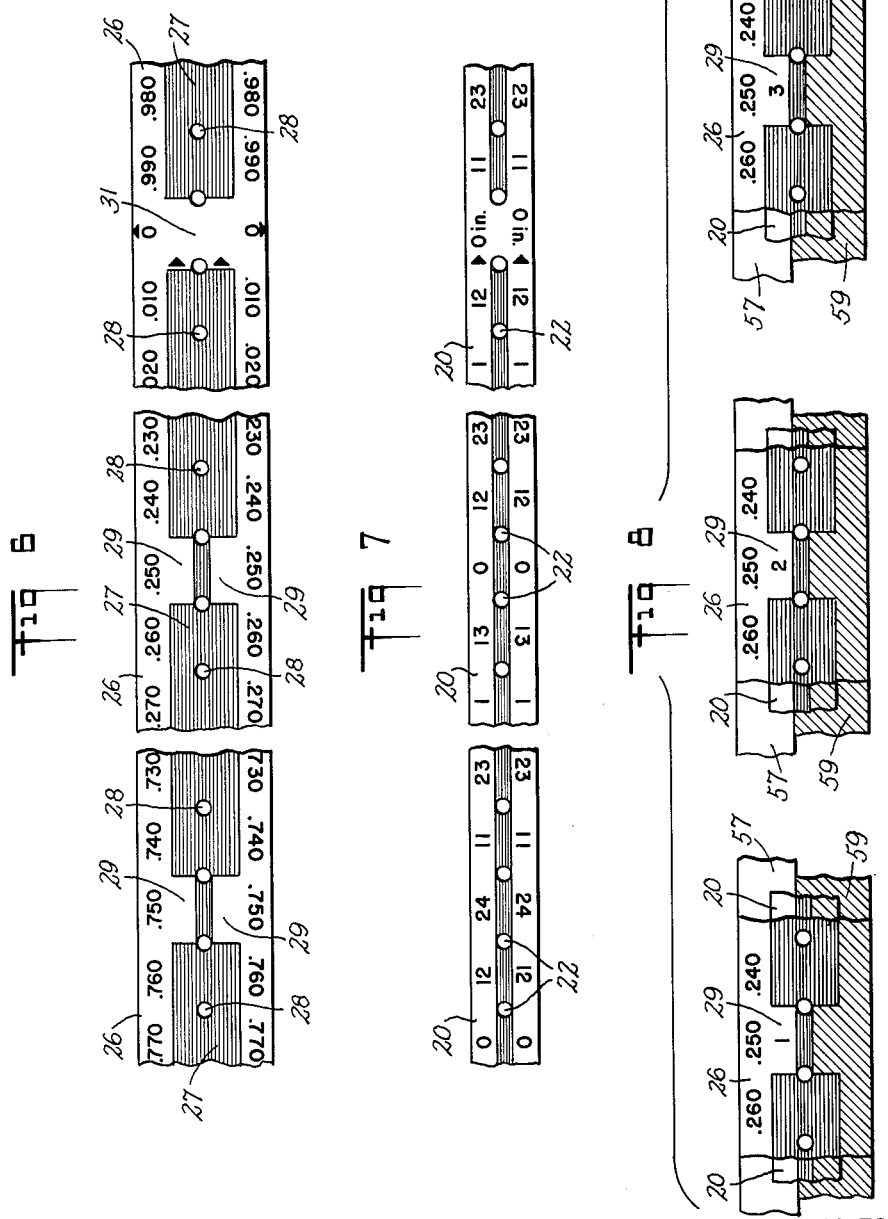

United States Patent Office 3,198,165
Patented Aug. 3, 1965

3,198,165
ANGULAR POSITION INDICATOR FOR
ROTATABLE ELEMENT
George Hamlin Leonard, Darien, Conn., assignor to
Hamlin Leonard Associates, Inc., Stamford, Conn.
Filed July 9, 1962, Ser. No. 208,287
18 Claims. (Cl. 116—115.5)

This invention relates to position-indicating attachments for rotating devices, and more particularly to position indicators for operation with the feed screw of a machine tool work table to indicate the position of the workpiece and table relative to the cutting tool during progressive movement of the table.

In machine tools such as milling machines, drill presses, and the like, movement of the workpiece relative to the cutting tool is often produced by rotation of a threaded feed screw having a calibrated dial. In one milling machine, for example, five revolutions of the feed screw generally produce table travel of one inch, and the dial increments are marked with a series of calibrations each of which represents five different positions in each inch of table travel. The machine tool operator is therefore hampered in moving the workpiece by a distance requiring more than one feed screw revolution, and he must make a mental note of the number of revolutions, converting them into increments of movement and adding the whole to the fractional indication on the dial to produce a figure corresponding to the total table travel. When in doubt, the operator must employ a calibrated rule to check the workpiece position relative to the cutting tool. Such a precedure is wasteful and time-consuming.

Revolution counters and odometers do not provide satisfactory table position indications for several reasons. They are unable to perform at the high feed screw revolution speeds employed in traversing the machine tool table from one end of its travel to the other unless they are high precision instruments, extremely well made and expensive. Revolution counters are generally not reversible, and therefore they will count revolutions of the traversing feed screw for only one direction of table travel. Revolution counters are easily damaged by the dust, dirt, coolants, abrasive chips and grit involved in machining operations.

For all of these reasons, no satisfactory reliable workpiece position indicator has been available for use in the machine tool field before the present invention.

Accordingly, a principal object of the invention is to provide a precise and easily-readable position indicator for traversing machine tool tables or the like.

Another object of the invention is to provide position indicators of the above character which are economical and convenient to manufacture and use, and which may be conveniently attached to standard machine tools.

A further object of the invention is to provide position indicators of the above character which will indicate traversing table travel in both directions.

Another object of the invention is to provide position indicators of the above character capable of indicating not only fractional increments of a unit of table traversing movement, but also a total number of units traveled by the machine tool table.

Another object of the invention is to provide position indicators of the above character which are easily mounted on the indicator spindle of a standard feed-screw-driven machine tool table, taking advantage of the calibrated dial thereon and moving freely with the movement of the machine tool table.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing in which:

FIGURE 1 is a fragmentary schematic perspective view of a milling machine, having a workpiece table and a cutting tool, and incorporating the present invention;

FIGURE 2 is an enlarged fragmentary axial sectional view taken along the line 2—2 in FIGURE 1 showing one embodiment of the present invention mounted in operative position on the feed screw indicating dial of a machine tool;

FIGURE 3 is a transverse sectional view of the embodiment of the invention shown in FIGURE 2, taken along the line 3—3 of FIGURE 2;

FIGURE 4 is a fragmentary persepctive view of the lower ends of two indicating belts employed in the embodiment of the invention shown in the figures;

FIGURE 5 shows a fragmentary view of the endless belts of the present invention mounted for synchronized rotation on the indicating dial of the traversing feed screw of the machine tool;

FIGURES 6, 7 and 8 show overlapping visual-indicating belts employed in the embodiment illustrated in the figures, with the fractional increment indicating belt being shown in FIGURE 6, the major unit indicating belt being shown in FIGURE 7, and the belts juxtaposed for combined reading being shown in FIGURE 8.

Similar reference characters refer to similar parts throughout the several views of the drawing.

In the preferred embodiment of the invention shown in the drawings, two translucent endless belts are employed having continuous series of equally spaced index points such as sprocket holes positioned along their lengths. These belts are superimposed on a hub having indexing elements such as sprocket teeth thereon. In the illustrated embodiments, such a sprocketed hub is mounted on the indicating dial of a machine tool feed screw. The sprocket holes and sprocket teeth are equally spaced, but the overlapping belts are of different lengths, with the outer belt being longer than the inner belt by an increment equal to the space between one, two or a larger integral number of sprocket holes. The belts are marked with easily readable position indications, with the outer belt showing calibrations corresponding to the fractional-inch or "minor" increments of machine tool table travel, either sixty-fourths or thousandths of an inch, for example, while the inner belt is marked with "major" increments such a whole numbers of inches of table travel. When they are superimposed, both belts may be observed simultaneously by the machine tool operator.

Revolution of the feed screw to produce traversing movement of the machine tool table turns both belts simultaneously by an equal linear amount. A complete revolution of the outer belt produces the identical linear travel of the inner belt; since the inner belt is shorter than the outer belt by an integral number of sprocket hole spaces, *h,* the inner belt is relatively displaced by *h* sprocket hole spaces with respect to the outer belt during the succeeding revolution of the outer belt. Similar relative displacement of the belts, or "differential shifting" action, occurs during each succeeding revolution of the outer belt.

In the illustrated embodiment, portions of the outer belt are opaque, leaving translucent or cut-away windows through which major incremental units appearing on the inner belt are revealed to the operator. Successive differential shifting of the two belts reveals successive major increments to the operator, which are visible in conjunction with the fractional minor increments appearing on the outer belt. Thus the operator is provided with a direct reading indication of the machine tool table position throughout its entire traversing movement, which may be fifty inches or more, since both inches and fractions may be read at one particular point or region on the juxtaposed belts.

In the preferred embodiment of the invention, the indicating belts are mounted on a detachable sprocket hub which is conveniently fitted over the feed screw dial of the machine tool table. The belts are formed of such translucent and long-wearing material as terephthalate polyester, popularly known by the registered trademark "Mylar," and they are held in free hanging and easily movable elongated loops by an eccentric double roller positioned at the bottom of the two belt loops, and assuring smooth sprocketing operation when the feed screw revolves.

Two position indicators incorporating the present invention are illustrated in FIGURE 1, an indicator 10 being mounted on the lefthand longitudinal feed screw dial 12 of the milling machine work table illustrated, and an indicator 14 being mounted on the transverse feed screw dial 16 of the machine tool. In each of the indicator 10 and 14, a removable indexing hub 18 is mounted directly on the feed screw dial 12 or 16, with indexing elements such as protruding sprocket teeth 24 aligned with the principal divisions marked on the feed screw dial, as shown in FIGURE 5. An inner belt 20 having equally spaced central index points, such as sprocket holes 22, is looped over the sprocket hub 18 in engagement with sprocket teeth 24.

Surrounding the belt 20 and superimposed thereover on the sprocket teeth 24 is an outer belt 26 having similar equally spaced central sprocket holes 28. Outer belt 26 is longer than inner belt 20 by an integral number of sprocket hole spaces, the center-to-center distances between adjacent sprocket holes. Inner belt 20 may have 48 central sprocket holes 22, for example, while outer belt 26 has 50 holes 28.

REMOVABLE INDEXING HUB

As shown in FIGURES 2, 3 and 5, the belt-supporting indexing hub 18 is mounted directly over the calibrated dial 12 of the feed screw, leaving the dial calibrations visible while substituting for their numbered dial readings the minor increment markings on the outer belt 26.

The dial 12 has its normal graduations representing thousandths of an inch, with every tenth graduation marked from 0 up to 0.190 inch when five complete revolutions of the feed screw are required to advance the machine tool table by a one-inch increment. If the outer belt 26 is made with its total length five times the circumference of the hub 18, five revolutions of the feed screw will produce a single revolution of the belt 26, which may have graduations marked in the same increments from 0 up to 0.990 as shown in FIGURE 5, with its own fractional or minor increment calibration markings supplanting those on the dial itself.

Normally the length of the outer belt 26 and the diameter of the indexing hub 18 will both be selected to provide a single revolution of belt 26 produced by the amount of feed screw rotation corresponding to one standard unit of forward traversing movement of the machine tool table. Thus position indicators of this invention may be constructed conveniently for installation on any standard commercial machine tool.

The sprocket hub 18, as shown in FIGURES 2 and 3, is conveniently formed of a split sleeve which may be molded of plastic material in interchangeable mating halves 30 and 32, each having a key 34 dimensioned for tight axial sliding movement into a mating keyway 36 in the opposing half of the sprocketed hub. Protruding sprocket teeth 24 may be directly molded on the periphery of the hub halves 30 and 32 during the original molding operation, or they may be formed of harder material such as metal and individually or integrally inset into the rim of the sprocket hub halves 30 and 32.

The sprocket hub 18 is formed with an inwardly projecting central flange 38 having a central aperture dimensioned to fit over the threaded shaft portion 40 of the feed screw crank handle, against the conventional shoulder 42 of the feed screw crank hub.

A zero-set stud 44 is positioned on the periphery of the shoulder 42 by means of a hose-clamp type clamping band 46. The stud 44 is mounted on a threaded nut 48 engaging one end of the strap 46 and threaded onto a screw 50 engaging the other end of the strap 46. Strap 46 is placed around shoulder 42 and screw 50 is tightened within nut 48, with strap 46 first being positioned with stud 44 in radial alignment with one of the major scale divisions of the feed screw dial 12.

A zero-notch 54 is provided in the inwardly projecting flange 38 of the sprocket hub 18 for alignment and engagement with the zero-set stud 44. As indicated in FIGURE 3, the zero-notch 54 is positioned centrally between two sprocket teeth on hub 18. The wide rim of the sprocket hub 18 is provided with a dial flange 56 projecting forward to cover the graduation calibration numbers of the machine tool feed screw dial 12 without covering the division markings of the dial 12, as shown in FIGURES 2 and 5. The axially opposite edge of the sprocket hub rim is provided with a ribbed or knurled finger grip portion 58 permitting convenient adjustment of the hub 18 in rotary movement until zero-notch 54 engages zero-set stud 44 during mounting of the hub 18 over the feed screw dial 12. The standard nut 60 is then turned forward along the threaded shaft portion 40 to clamp the sprocket hub 18 in this adjusted position.

The foregoing arrangement of the sprocket hub 18 permits the usual unclamping, free rotary adjustment and clamping of the dial 12 to conform to any desired zero position of the machine tool table relative to the cutting tool. For example, when the table is set in a particular "zero" position, the nut 60 is backed off slightly and the entire dial hub assembly 18-12 may be rotated by the operator using knurled portion 58 to bring a scale division on the dial 12 into alignment with the zero mark 13 on the machine tool table, as shown in FIGURE 5. Tightening the nut 60 automatically locks the dial 12 in the desired zero position with the sprocket teeth 24 already in proper alignment with the divisions on the dial 12.

THE ECCENTRIC ROLLER ASSEMBLY

A dual eccentric idling roller generally indicated at 62 in FIGURES 1-3 maintains the endless belts 20 and 26 in proper alignment and provides smooth sprocketing operation over the teeth 24 as the feed screw revolves. This assembly 62 includes a pair of spaced dual drums or rollers 64 integrally joined together by a reduced shaft 66. Loosely surrounding the shaft 66 is a central hollow roller 68 positioned between the drum portions 64 surrounding the reduced shaft 66 and freely rotatable thereon. The central roller 68 is generally similar in width to the narrow inner belt 22 and the combined widths of the two rollers 64 and the central roller 68 is generally the same as the width of the outer belt 26.

An enlarged peripheral flange 70 on each of the outer rollers 64 permits the eccentric idler roller assembly 62 to be placed within and suspended at the lower end of the looped belts 20 and 26. The inner belt 22 and the outer belt 26 both pass around the underside of the roller assembly 62, as shown in FIGURES 2 and 3. As the assembly 62 is lowered to place the belts under tension, the shorter length of the inner belt 20 displaces the inner roller 68 upwardly as shown in FIGURES 2 and 3, but the weight of the roller assembly 62 maintains both belts draped downward under slight tension, to keep them in proper working relationship.

OPERATION OF THE POSITION INDICATOR

The differential shifting action or relative displacement of the sprocket holes of the two belts during revolution of the feed screw is illustrated in FIGURES 3 and 4. With clockwise rotation of the hub 18, both belts descend on the righthand side of the loop, pass underneath the eccentric roller assembly 62 and ascend on the lefthand side of the loop, returning to encircle the hub 18. The spaces between the sprocket holes 22 in the inner belt 20 and the spaces between the sprocket holes 28 in the outer belt 26 are all substantially the same length. Accordingly, these holes pass around the sprocket hub 24 in substantially perfect alignment and descend on the righthand side of the double belt loop, remaining in alignment until they reach the bottom of the loops as shown in FIGURE 3. As the belts pass around the roller assembly 62, the differential shift of sprocket holes occurs, as shown in FIGURES 3 and 4. At the lower end of the belt loops, the shorter length of the inner belt 20 suspends the central idler roller 68 above the level of the two outer idler rollers 64. Thus in FIGURE 3, the illustrated lower portion of the inner belt loop shows ten sprocket holes 22 while the corresponding portion of the overlapped outer belt loop 26 contains twelve sprocket holes 28.

FIGURE 4 shows a perspective view of the lower ends of the belts 20 and 26, further illustrating this alignment of sprocket holes in both belts down both sides of the overlapped belt loops, with the differential shifting of sprocket holes occurring at the lower ends of the juxtaposed loops, and with the length of the two belt loops differing by only a single sprocket hole space.

POSITION INDICATING MARKINGS

Three different portions of the wide outer belt 26 are shown in FIGURE 6. On the righthand side of this figure, the zero position of the outer belt is seen. The middle segment of FIGURE 6 shows a portion of the outer belt 26 one-quarter of the way along the belt's circumference where the minor scale indication figure "0.250" appears on both edges of the belt. The lefthand portion of FIGURE 6 shows the minor scale indication "0.750" on both edges of the wide outer belt 26.

A central opaque portion 27 is provided, extending down the middle of outer belt 26 to mask the underlying belt 20 over the major portion of its length. At predetermined intervals, opaque portion 27 is provided with a diminished width leaving translucent windows 29 in alignment with the principal minor increment indications 0.250, 0.500 and 0.750, permitting major increment indications appearing on the underlying narrow belt 20 to be observed through these windows 29. Opaque band 27 is preferably broken by a transverse transparent portion 31 aligned with the zero indication on outer belt 26, to permit easy selection and alignment of this zero space with the two sprocket teeth 24 flanking the dial division on dial 12 which is aligned with the machine's zero mark 13 when the indicator is first set to its desired "zero" position.

One form of the underlying major-increment indicating belt 20 is shown broken into similar segments in FIGURE 7. The right hand segment shows the zero indication, which is aligned with the transparent zero space 31 on the overlying wide belt when these belts 20 and 26 are placed around the sprocket hub 18 in its "zero" position. If forward feed of the machine tool table is produced by righthand revolution of the feed screw, the upper sequence of indications shown on both belts are arrayed increasing from right to left as the tape moves toward the right over the rotating hub 18. For table travel in the reverse direction, scale indications increasing with belt revolution of the opposite sense are arrayed along the opposite edges of the two tapes. A single array of scale indications transversely oriented (not shown) may be observed from a tangential position for either sense of belt revolution.

The indicating markings on the two differential belts are indicated in the following Tables 1–4 for several different juxtaposed positions of the belts in one embodiment of the invention, in which the belts differ in length by only one sprocket-hole space. In these tables, the first colume of figures represents the minor scale indications appearing on the outer belt 26. These indications cover a full inch of table travel in 0.010 increments. The second column of figures in each table represents the juxtaposed major scale indications on the shorter inner belt 20, and the selected few of these which are visible through apertures or viewing areas 29 and 31 are shown in rectangles numbered to correspond with these apertures. The left, center and right portions of FIGURE 8 show the aperture 29 at the 0.250 point on belt 26, with three successive major scale indications on belt 20 being visible therein during three succesive operating cycles. While the other major scale indications on belt 20 are not seen by the operator, they are shown in the table to explain the differential shifting of the juxtaposed belts.

The belt 20 represented in FIGURE 7 has two interleaved series or sequence of major scale indications, and is used when belt 20 is two sprocket-hole spaces shorter than belt 26. The operation of this form of the invention is illustrated in Tables 5 and 6.

The upper end of these endless belts is represented by the stationary zero mark 13, appearing at the bottom of each table and again at the top, for completeness.

TABLE 1

| | Start of First Cycle | |
|---|---|---|
| | Belt 26 | Belt 20 |
| | .010 | 1 |
| 13 | 0.000 | [0] 31 |
| | .990 | 23 |
| | .980 | 22 |
| | .970 | 21 |
| | .960 | 20 |
| | .950 | 19 |
| | .940 | 18 |
| | .930 | 17 |
| | .920 | 16 |
| | .910 | 15 |
| | .900 | 14 |
| | .890 | 13 |
| | .880 | 12 |
| | .870 | 11 |
| | .860 | 10 |
| | .850 | 9 |
| | .840 | 8 |
| | .830 | 7 |
| | .820 | 6 |
| | .810 | 5 |
| | .800 | 4 |
| | .790 | 3 |
| | .780 | 2 |
| | .770 | 1 |
| | .760 | 0 |
| | .750 | [24] 29 |
| | .740 | 23 |
| | .730 | 22 |
| | .720 | 21 |
| | .710 | 20 |
| | .700 | 19 |
| | .690 | 18 |
| | .680 | 17 |

TABLE 2

| | Middle of First Cycle | |
|---|---|---|
| | Belt 26 | Belt 20 |
| | .510 | 1 |
| 13 | 0.500 | [0] 29 |
| | .490 | 24 |
| | .480 | 23 |
| | .470 | 22 |
| | .460 | 21 |
| | .450 | 20 |
| | .440 | 19 |
| | .430 | 18 |
| | .420 | 17 |
| | .410 | 16 |
| | .400 | 15 |
| | .390 | 14 |
| | .380 | 13 |
| | .370 | 12 |
| | .360 | 11 |
| | .350 | 10 |
| | .340 | 9 |
| | .330 | 8 |
| | .320 | 7 |
| | .310 | 6 |
| | .300 | 5 |
| | .290 | 4 |
| | .280 | 3 |
| | .270 | 2 |
| | .260 | 1 |
| | .250 | [0] 29 |
| | .240 | 24 |
| | .230 | 23 |
| | .220 | 22 |
| | .210 | 21 |
| | .200 | 20 |
| | .190 | 19 |
| | .180 | 18 |

TABLE 1

Start of First Cycle

| Belt 26 | Belt 20 |
|---------|---------|
| .670 | 16 |
| .660 | 15 |
| .650 | 14 |
| .640 | 13 |
| .630 | 12 |
| .620 | 11 |
| .610 | 10 |
| .600 | 9 |
| .590 | 8 |
| .580 | 7 |
| .570 | 6 |
| .560 | 5 |
| .550 | 4 |
| .540 | 3 |
| .530 | 2 |
| .520 | 1 |
| .510 | [0] |
| .500 | 24 |
| .490 | 29 |
| .480 | 23 |
| .470 | 22 |
| .460 | 21 |
| .450 | 20 |
| .440 | 19 |
| .430 | 18 |
| .420 | 17 |
| .410 | 16 |
| .400 | 15 |
| .390 | 14 |
| .380 | 13 |
| .370 | 12 |
| .360 | 11 |
| .350 | 10 |
| .340 | 9 |
| .330 | 8 |
| .320 | 7 |
| .310 | 6 |
| .300 | 5 |
| .290 | 4 |
| .280 | 3 |
| .270 | 2 |
| .260 | 1 |
| .250 | [0] 29 |
| .240 | 24 |
| .230 | 23 |
| .220 | 22 |
| .210 | 21 |
| .200 | 20 |
| .190 | 19 |
| .180 | 18 |
| .170 | 17 |
| .160 | 16 |
| .150 | 15 |
| .140 | 14 |
| .130 | 13 |
| .120 | 12 |
| .110 | 11 |
| .100 | 10 |
| .090 | 9 |
| .080 | 8 |
| .070 | 7 |
| .060 | 6 |
| .050 | 5 |
| .040 | 4 |
| .030 | 3 |
| .020 | 2 |
| .010 | 1 |
| 13 .000 | [0] 31 |
| .990 | 23 |
| .980 | 22 |

TABLE 2

Middle of First Cycle

| Belt 26 | Belt 20 |
|---------|---------|
| .170 | 17 |
| .160 | 16 |
| .150 | 15 |
| .140 | 14 |
| .130 | 13 |
| .120 | 12 |
| .110 | 11 |
| .100 | 10 |
| .090 | 9 |
| .080 | 8 |
| .070 | 7 |
| .060 | 6 |
| .050 | 5 |
| .040 | 4 |
| .030 | 3 |
| .020 | 2 |
| .010 | [1] |
| 0.000 | [0] 31 |
| .990 | |
| .980 | 23 |
| .970 | 22 |
| .960 | 21 |
| .950 | 20 |
| .940 | 19 |
| .930 | 18 |
| .920 | 17 |
| .910 | 16 |
| .900 | 15 |
| .890 | 14 |
| .880 | 13 |
| .870 | 12 |
| .860 | 11 |
| .850 | 10 |
| .840 | 9 |
| .830 | 8 |
| .820 | 7 |
| .810 | 6 |
| .800 | 5 |
| .790 | 4 |
| .780 | 3 |
| .770 | 2 |
| .760 | 1 |
| 0.750 | [0] 29 |
| .740 | 24 |
| .730 | 23 |
| .720 | 22 |
| .710 | 21 |
| .700 | 20 |
| .690 | 19 |
| .680 | 18 |
| .670 | 17 |
| .660 | 16 |
| .650 | 15 |
| .640 | 14 |
| .630 | 13 |
| .620 | 12 |
| .610 | 11 |
| .600 | 10 |
| .590 | 9 |
| .580 | 8 |
| .570 | 7 |
| .560 | 6 |
| .550 | 5 |
| .540 | 4 |
| .530 | 3 |
| .520 | 2 |
| .510 | 1 |
| 13 0.500 | [0] 29 |
| .490 | 24 |
| .480 | 23 |

One sprocket hole differential shift of scales over roller assembly 62 at lower end of juxtaposed belt loops.

TABLE 3

Start of Second Cycle

| Belt 26 | Belt 20 |
|---------|---------|
| .900 | 15 |
| .890 | 14 |
| .880 | 13 |
| .870 | 12 |
| .860 | 11 |
| .850 | 10 |
| .840 | 9 |
| .830 | 8 |
| .820 | 7 |
| .810 | 6 |
| .800 | 5 |
| .790 | 4 |
| .780 | 3 |
| .770 | 2 |
| .760 | 1 |
| .750 | [0] 29 |
| .740 | 24 |
| .730 | 23 |
| .720 | 22 |
| .710 | 21 |
| .700 | 20 |
| .690 | 19 |
| .680 | 18 |
| .670 | 17 |
| .660 | 16 |
| .650 | 15 |
| .640 | 14 |
| .630 | 13 |
| .620 | 12 |
| .610 | 11 |
| .600 | 10 |
| .590 | 9 |
| .580 | 8 |
| .570 | 7 |
| .560 | 6 |
| .550 | 5 |
| .540 | 4 |
| .530 | 3 |
| .520 | 2 |
| .510 | [1] |
| .500 | [0] 29 |
| .490 | |
| .480 | 24 |
| .470 | 23 |
| .460 | 22 |
| .450 | 21 |
| .440 | 20 |
| .430 | 19 |
| .420 | 18 |
| .410 | 17 |
| .400 | 16 |
| .390 | 15 |
| .380 | 14 |
| .370 | 13 |
| .360 | 12 |
| .350 | 10 |
| .340 | 11 |
| .330 | 9 |
| .320 | 8 |
| .310 | 7 |
| .300 | 6 |
| .290 | 5 |
| .280 | 4 |
| .270 | 3 |
| .260 | 2 |
| .250 | [1] 29 |
| .240 | 0 |
| .230 | 24 |
| .220 | 23 |
| .210 | 22 |
| .200 | 21 |
| .190 | 20 |
| .180 | 19 |
| .170 | 18 |
| .160 | 17 |
| .150 | 16 |
| .140 | 15 |
| .130 | 14 |
| .120 | 13 |
| .110 | 12 |
| .100 | 11 |
| .090 | 10 |
| .080 | 9 |
| .070 | 8 |
| .060 | 7 |
| .050 | 6 |
| .040 | 5 |
| .030 | 4 |
| .020 | 3 |
| .010 | 2 |
| 13 .000 | [1] 31 |
| .990 | 0 |
| .980 | 23 |

TABLE 4

Middle of Second Cycle

| Belt 26 | Belt 20 |
|---------|---------|
| .400 | 16 |
| .390 | 15 |
| .380 | 14 |
| .370 | 13 |
| .360 | 12 |
| .350 | 11 |
| .340 | 10 |
| .330 | 9 |
| .320 | 8 |
| .310 | 7 |
| .300 | 6 |
| .290 | 5 |
| .280 | 4 |
| .270 | 3 |
| .260 | 2 |
| .250 | [1] 29 |
| .240 | 0 |
| .230 | 24 |
| .220 | 23 |
| .210 | 22 |
| .200 | 21 |
| .190 | 20 |
| .180 | 19 |
| .170 | 18 |
| .160 | 17 |
| .150 | 16 |
| .140 | 15 |
| .130 | 14 |
| .120 | 13 |
| .110 | 12 |
| .100 | 11 |
| .090 | 10 |
| .080 | 9 |
| .070 | 8 |
| .060 | 7 |
| .050 | 6 |
| .040 | 5 |
| .030 | 4 |
| .020 | 3 |
| .010 | |
| 0.000 | [2] [1] 31 |
| .990 | 0 |
| .980 | 23 |
| .970 | 22 |
| .960 | 21 |
| .950 | 20 |
| .940 | 19 |
| .930 | 18 |
| .920 | 17 |
| .910 | 16 |
| .900 | 15 |
| .890 | 14 |
| .880 | 13 |
| .870 | 12 |
| .860 | 11 |
| .850 | 10 |
| .840 | 9 |
| .830 | 8 |
| .820 | 7 |
| .810 | 6 |
| .800 | 5 |
| .790 | 4 |
| .780 | 3 |
| .770 | 2 |
| .760 | |
| 0.750 | [1] 29 |
| .740 | 0 |
| .730 | 24 |
| .720 | 23 |
| .710 | 22 |
| .700 | 21 |
| .690 | 20 |
| .680 | 19 |
| .670 | 18 |
| .660 | 17 |
| .650 | 16 |
| .640 | 15 |
| .630 | 14 |
| .620 | 13 |
| .610 | 12 |
| .600 | 11 |
| .590 | 10 |
| .580 | 9 |
| .570 | 8 |
| .560 | 7 |
| .550 | 6 |
| .540 | 5 |
| .530 | 4 |
| .520 | 3 |
| .510 | 2 |
| .500 | [1] 29 |
| .490 | 0 |
| 13 .480 | 24 |

One sprocket hole differential shift of scales over roller assembly 62 at lower end of juxtaposed belt loops.

TABLE 3

Start of Second Cycle

| Belt 26 | Belt 20 |
|---------|---------|
| .010 | 2 |
| 13 0.000 | [1] 31 |
| .990 | 0 |
| .980 | 23 |
| .970 | 22 |
| .960 | 21 |
| .950 | 20 |
| .940 | 19 |
| .930 | 18 |
| .920 | 17 |
| .910 | 16 |

TABLE 4

Middle of Second Cycle

| Belt 26 | Belt 20 |
|---------|---------|
| .510 | 2 |
| 0.500 | [0] 29 |
| .490 | 0 |
| 13 .480 | 24 |
| .470 | 23 |
| .460 | 22 |
| .450 | 21 |
| .440 | 20 |
| .430 | 19 |
| .420 | 18 |
| .410 | 17 |

| TABLE 5 | | | TABLE 6 | |
|---|---|---|---|---|
| Start of First Cycle | | | Middle of First Cycle | |
| Belt 26 | Belt 20 | | Belt 26 | Belt 20 |
| .010 | 12 | | .510 | 13 |
| 0.000 | [0]  31 | | 0.500 | [0]  29 |
| .990 | 11 | | .490 | 12 |
| .980 | 23 | | .480 | 24 |
| .970 | 10 | | .470 | 11 |
| .960 | 22 | | .460 | 23 |
| .950 | 9 | | .450 | 10 |
| .940 | 21 | | .440 | 22 |
| .930 | 8 | | .430 | 9 |
| .920 | 20 | | .420 | 21 |
| .910 | 7 | | .410 | 8 |
| .900 | 19 | | .400 | 20 |
| .890 | 6 | | .390 | 7 |
| .880 | 18 | | .380 | 19 |
| .870 | 5 | | .370 | 6 |
| .860 | 17 | | .360 | 18 |
| .850 | 4 | | .350 | 5 |
| .840 | 16 | | .340 | 17 |
| .830 | 3 | | .330 | 4 |
| .820 | 15 | | .320 | 16 |
| .810 | 2 | | .310 | 3 |
| .800 | 14 | | .300 | 15 |
| .790 | 1 | | .290 | 2 |
| .780 | 13 | | .280 | 14 |
| .770 | 0 | | .270 | 1 |
| .760 | 12 | | .260 | 13 |
| .750 | [24]  29 | | .250 | [0]  29 |
| .740 | 11 | | .240 | 12 |
| .730 | 23 | | .230 | 23 |
| .720 | 10 | | .220 | 11 |
| .710 | 22 | | .210 | 22 |
| .700 | 9 | | .200 | 10 |
| .690 | 21 | | .190 | 21 |
| .680 | 8 | | .180 | 9 |
| .670 | 20 | | .170 | 20 |
| .660 | 7 | | .160 | 8 |
| .650 | 19 | | .150 | 19 |
| .640 | 6 | | .140 | 7 |
| .630 | 18 | | .130 | 18 |
| .620 | 5 | | .120 | 6 |
| .610 | 17 | | .110 | 17 |
| .600 | 4 | | .100 | 5 |
| .590 | 16 | | .090 | 16 |
| .580 | 3 | | .080 | 4 |
| .570 | 15 | | .070 | 15 |
| .560 | 2 | | .060 | 3 |
| .550 | 14 | | .050 | 14 |
| .540 | 1 | | .040 | 2 |
| .530 | 13 | | .030 | 13 |
| .520 | 0 | | .020 | 1 |
| .510 | | Two sprocket hole differential shift of scales over roller assembly 62 at lower end of juxtaposed belt loops. | .010 | |
| .500 | [12]  29 | | 0.000 | [12]  31 |
| .490 | | | .990 | |
| .480 | 24 | | .980 | 0 |
| .470 | 11 | | .970 | 11 |
| .460 | 23 | | .960 | 23 |
| .450 | 10 | | .950 | 10 |
| .440 | 22 | | .940 | 22 |
| .430 | 9 | | .930 | 9 |
| .420 | 21 | | .920 | 21 |
| .410 | 8 | | .910 | 8 |
| .400 | 20 | | .900 | 20 |
| .390 | 7 | | .890 | 7 |
| .380 | 19 | | .880 | 19 |
| .370 | 6 | | .870 | 6 |
| .360 | 18 | | .860 | 18 |
| .350 | 5 | | .850 | 5 |
| .340 | 17 | | .840 | 17 |
| .330 | 4 | | .830 | 4 |
| .320 | 16 | | .820 | 16 |
| .310 | 3 | | .810 | 3 |
| .300 | 15 | | .800 | 15 |
| .290 | 2 | | .790 | 2 |
| .280 | 14 | | .780 | 14 |
| .270 | 1 | | .770 | 1 |
| .260 | 13 | | .760 | 13 |
| .250 | [0]  29 | | 0.750 | [0]  29 |
| .240 | 12 | | .740 | 12 |
| .230 | 23 | | .730 | 24 |
| .220 | 11 | | .720 | 11 |
| .210 | 22 | | .710 | 23 |
| .200 | 10 | | .700 | 10 |
| .190 | 21 | | .690 | 22 |
| .180 | 9 | | .680 | 9 |
| .170 | 20 | | .670 | 21 |
| .160 | 8 | | .660 | 8 |
| .150 | 19 | | .650 | 20 |
| .140 | 7 | | .640 | 7 |
| .130 | 18 | | .630 | 19 |
| .120 | 6 | | .620 | 6 |
| .110 | 17 | | .610 | 18 |
| .100 | 5 | | .600 | 5 |
| .090 | 16 | | .590 | 17 |
| .080 | 4 | | .580 | 4 |
| .070 | 15 | | .570 | 16 |

| TABLE 5 | | | TABLE 6 | |
|---|---|---|---|---|
| Start of First Cycle | | | Middle of First Cycle | |
| Belt 26 | Belt 20 | | Belt 26 | Belt 20 |
| .060 | 3 | | .560 | 3 |
| .050 | 14 | | .550 | 15 |
| .040 | 2 | | .540 | 2 |
| .030 | 13 | | .530 | 14 |
| .020 | 1 | | .520 | 1 |
| .010 | 12 | | .510 | 13 |
| .000 | [0]  31 | | .500 | [0]  29 |
| .990 | 11 | | .490 | 12 |
| .980 | 23 | | .480 | 24 |

On these tables, the juxtaposed scale indications on both the outer and inner belts are shown in their actual positions at various points in several cycles of operation. In Table 1, it will be seen that the alignment of sprocket holes throughout the major length of both belts produces matching of the major scale indications on belt 20 with the minor scale indications on belt 26 at all points except at the lower end of the two belt loops, shown in the middle of the table. At this lower point, where both belts pass around the roller assembly 62, there is a shifting of the major scale indications on the inner belt 20 produced by its shorter length, achieving the differential shift required for continuous reading of successive major scale indications through successive cycles of operation.

In Table 1, the two zero positions of zero indications appearing on both belts are aligned at the beginning, the start of the first cycle, as shown at the bottom and top of the table. The belts are positioned for increasing readings as downward movement of the belts past zero-mark 13 occurs, corresponding to the rotation of the feed screw. Thus the major scale indication "0" appears in window 31 juxtaposed with the minor scale indication ".000" appearing on the outer belt 26. The next "0" major scale indication appears in window 29, juxtaposed with the minor scale indication of "0.250," and a forward movement of the belts will permit the observed to see either of these first two zeros over the range of minor scale indications between 0.000 and 0.250.

At the start of the first cycle, as shown in the central part of Table 1, a one sprocket hole differential shift of the two scales is occurring at the roller assembly 62, and "24" is passing out of and "0" is passing into the window 29 juxtaposed with the 0.500 minor scale indication on the outer belt 26. Forward movement of the belts past the roller assembly 62 will complete the shift and bring the new zero into view in this window 29.

The window 29 at the 0.750 minor scale indication shows the former major scale indication "24," which will be shifted to the succeeding "0" when this juxtaposed portion of the belts passes around the roller assembly 62 with further forward movement of the belts. The window 31 appearing at the top of Table 1 and corresponding to 0.000 on belt 26, is the same window 31 represented at the bottom of Table 1, since both belts are endless.

When forward movement of the belts has brought the 0.500 minor scale indication to the upper end of the juxtaposed belts, as shown at the bottom and again at the top of Table 2, the major scale indication zero appears in the window 29 opposite the 0.500 minor scale indication. The zero also appears in the next window 29 opposite the 0.750 minor scale indication. The "0.000" on the outer belt 26 has now reached the roller assembly 62, where the differential shift is moving the "0" major scale indication out of the corresponding window 31, and the major scale indication "1" is moving into view in window 31 while the belts are passing around the roller assembly. At the window 29 corresponding to 0.250, the zero still appears. A comparison of Tables 1 and 2 will show that during the start of table travel near the zero point, the observer can read 0.000 and 0.250 in the two visible windows in the outer belt. Correspondingly, when table travel has progressed about ½ inch, major scale indications will be visible in the observable windows 29 at 0.250, 0.500, and 0.750. Thus, by quickly examining both belts, the observer can tell at a glance how far the table has traveled in inches and thousandths of an inch without the use of rules, tables, counting, multiplying, or anything more than simple observation of the juxtaposed belts.

Successive positions of the juxtaposed belts are shown in Tables 3 and 4 at the start and middle of the second cycle of the revolution of belt 26, respectively, showing the appearance of the "1" inch symbol at viewing areas 29 and 31, once in each of the three areas 29 as the minor indications on belt 26 advance successively to 0.250, 0.500 and 0.750, after which the "2" inch symbol will appear in viewing area 31 adjacent the 0.000 indication. The sequences of indications are spaced apart in accordance with the spacing of the sprocket holes, and just as there is one fewer indication on belt 20 than on belt 26. There are four sequences of major indications on belt 20, three of those sequences including numbers "0" to "24" and the fourth sequence including numbers "0" through "23." Consequently there are 100 minor indications in the sequence on belt 26 compared to 99 major indications on belt 20.

The foregoing tables clearly show that the major scale indications on inner belt 20 appear in the windows of belt 26 throughout the revolution of the belts, except during the differential shift occurring as both belts pass around the roller assembly 62 at the bottom of their loops. Thus, in Table 1, the major scale indications (and sprocket holes 22) on inner belt 20 are aligned in registration with the minor scale indications (and sprocket holes 28) on outer belt 26 at all points around the juxtaposed belts except the differential shift region shown in FIGURES 3 and 4.

Since the upper end of the juxtaposed belts falls at fixed zero mark 13 throughout the travel of the two belts, the shifting occurs at the lower end of the belts, at the region of both belts most remote from the zero mark 13 directly viewed by the observer. This provides a substantial approaching region of the juxtaposed belts with the correct major scale indication appearing in the coordinating windows, and a comparable receding region of the juxtaposed belts also having the correct major scale indications appearing in the coordinating windows.

Indeed, substantially the entire observable length of the juxtaposed belts forms a continuous scale longer than a yardstick, with the major scale indications being clearly observable in at least three of the coordinating windows for continuous direct reading.

Since the differential shifting transition of major scale indications occurs at the generally unobservable lower ends of the looped belts, the entire observable length of the belts is constantly in the required juxtaposition for convenient observation, with the differential shifting rejuxtaposition occurring continuously at roller assembly 62, producing the effect of a continuous-reading scale of enormous length.

A different form of the inner shorter belt 20 is shown schematically in Tables 5 and 6, and in FIGURES 3 and 7. In this embodiment of the invention, the inner belt is shorter by two sprocket hole spaces and two major indications, producing a differential shift of two sprocket holes and thus of two major scale indications as the juxtaposed belts moved around the roller assembly 62. For this reason, the consecutive major scale indications are two spaces apart along the length of belt 20, and interspersed to make full use of the length of belt 20, as shown in FIGURE 7. The embodiment illustrated in Tables 5 and 6 provides the position indications for the same length of table travel as the embodiment illustrated in FIGURES 1-4, while doubling the eccentric offset of the separate rollers of roller assembly 62, facilitating the self aligning and guiding operation of the roller assembly. Belt 20 in Tables 5 and 6 has four sequences totaling 98 indications including two sequences "0" to "24" and two sequences "0" to "23," whereas belt 26 has a sequence of 100 indications, from 0.000 to 0.990.

The indexing hub 18 and the other elements of the invention may be employed with a fixed rotating shaft, such as the shaft of dial 16 in FIGURE 1, or a traversing shaft mounted for axial movement, such as the shaft of dial 12 in FIGURE 1.

If the direction of table travel is to be reversed, with control remaining at the same feed screw crank handle, the pair of belts 26 and 20 may be lifted from the indexing hub 18 and reversed, bringing the corresponding position indications increasing in the opposite direction into view adjoining the scale divisions of the dial 52. Counterclockwise revolution of the crank handle causing counterclockwise rotation of the superimposed belts now produces successive movement of the outer belt with increasing minor increment scale indications, and with differential shifting of the inner belt revealing major scale indications in windows 29 and 31 corresponding to the major increments of table movement in the manner described above for the reverse direction of traversing table travel.

For enhanced convenience of visual observation, the rim 56 of sprocket hub 18 is provided with a light colored peripheral portion 57 adjacent the scale 12 underlying the adjoining edge of the two translucent belts for maximum visibility of their dark markings, and a darker portion 59 of hub rim 56 beneath the opposite edges of the two belts adjoining the knurled portion 58 reduces the visibility of the momentarily unused scale markings for the opposite direction of travel. These light and dark faces of the rim 56, indicated in FIGURE 8 produce the observable indications shown in FIGURES 5 and 8, with only one series of minor scale indications being visible to the operator.

Where tolerances of sixty-fourths of an inch are adequate for a particular machining operation, a similar outer belt 26 graduated in sixty-fourths may be substituted for the belt 26 described above. Mylar plastic has proved highly effective for the flexible sprocket belts of the present invention, with the scale markings and opaque bands printed directly on the face of the belts. Mylar is desirably flexible and sufficiently slippery to engage and disengage the sprocket teeth 24 at any desired speed of feed screw rotation.

The position indicators of this invention are easily and quickly installed and removed on the standard machine tools for which they are designed. Furthermore, one or more indexing hub 18 may be left in place permanently on each machine tool, while the belts 20 and 26 and the roller assembly 62 may be stored separately for use whenever required.

The indicators of this invention provide accurate high speed indication of relative positions of work piece and tool cutting point throughout the traversing movement of the machine tool table. These indications are exactly as accurate as the original graduated dial 12 of the machine tool feed screw itself. The indicating belts 20 and 26 can be marked or easily reversed to indicate traversing movement of the machine tool table in either direction. The invention eliminates errors by providing an accurate foolproof showing of the total number of belt revoltuions or major increments (inches) traveled by the table, as well as such minor increments as thousandths or sixty-fourths of an inch of table travel.

It will thus be seen that the objects set forth above, among those made apparent from the preceding description, are efficiently attained and since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described which as a matter of language might be said to fall therebetween.

I claim:
1. A work table position indicator for a machine tool comprising, in combination,
(A) a shaft whose rotation determines the position of a work table
(B) an indexing hub mounted for rotation with said shaft and having
(1) measuring indicia marked on its periphery and
(2) regularly spaced teeth protruding from its periphery which are incrementally related to said indicia
(C) a first endless belt
(1) aligned to be moved with said hub, and
(2) having regularly spaced holes therein
(a) the distances between said holes and said teeth being equal and representing predetermined measuremental increments of table movement,
(b) the spaces between said holes being consecutively numbered,
(D) and a second endless belt
(1) shorter than said first endless belt by an integral number of said distances,
(2) having holes therein regularly spaced apart the same distance as said spaced teeth
(3) aligned to be moved with said hub adjacent said first endless belt
(4) and having major scale indications marked thereon,
whereby information concerning the amount of movement of said table may be read from said belt.

2. The combination defined by claim 1 with
(C)(2) said first endless belt having viewing apertures formed therein in registration with said major scale indications,
whereby selected major scale indications are successively exposed to view through said apertures during rotation of said shaft and indexing hub.

3. An angular position indicator for a rotatable element comprising, in combination,
(A) an indexing hub mounted for rotation with the rotatable element and having a plurality of indexing elements thereon
(B) a first belt
(1) having index points spaced at intervals along its length
(2) with minor scale indications positioned along the length of said first belt corresponding to said intervals, and
(3) a plurality of coordinating means spaced therealong at integral multiples of said intervals in registration with selected major scale indications,
(C) and a second belt
(1) Also having index points spaced at intervals along its length
(2) with major scale indications positioned along the length of said second belt being at multiples of said intervals,
(D) both said belts having their index points cooperatively engaged with the indexing elements on said hub
(E) said second belt being shorter than said first belt by an integral number of said intervals,
whereby rotation of said hub producing successive revolutions of said first belt causes a shifting of the relative juxtaposition of said belts, presenting successive new major scale indications to registration with said coordinating means.

4. The combination defined in claim 3, wherein said first belt is provided with masking means shaped to expose to view intermittent selected major scale indications on said second belt, with said shifting relative juxtaposition progressively changing the major scale indications exposed by said masking means during rotation of said indexing hub.

5. The combination defined in claim 3 in which said indexing hub is removably and alignably secured to the graduated dial sleeve of a machine tool feed screw.

6. The combination defined in claim 3 in which said shorter belt and said longer belt adjacently depend downward and in which separate rollers with their axes substantially parallel but eccentrically aligned are supported within said belts, whereby said relative juxtaposition is maintained during movement of said belts.

7. The combination defined in claim 3 in which said indexing elements are formed as sprocket teeth protruding from said indexing hub, and said index points are mating sprocket holes formed in both said belts.

8. An angular position indicator for a rotatable element comprising, in combination,
(A) a sprocket hub
(1) mounted for rotation in synchronism with the rotatable element
(2) and having a ring of sprocket teeth protruding from its periphery,
(B) a first belt
(1) having sprocket holes formed therein and spaced at intervals along its length,
(2) with minor scale indications marked along the length of said first belt corresponding to said intervals
(3) and having a longitudinally extending opaque portion with translucent segments formed therein at intervals along the length of said first belt,
(C) and a second belt
(1) having corresponding sprocket holes formed therein and spaced at intervals along its length,
(2) with major scale indications marked on said second belt in alignment with said translucent segments in said opaque portion of said first belt,
(D) said second belt being shorter than said first belt by an integral number of said spaces,
(E) and both said belts having their sprocket holes engaging said ring of sprocket teeth on said hub.

9. The combination defined in claim 8 with
(E) said minor scale indications being marked along a translucent portion of said first belt
(F) and said hub having a peripheral band in a color contrasting with said minor scale indications spaced to underlie said minor scale indications,
whereby the visibility of said indications is enhanced.

10. The combination defined in claim 8 in which both said belts are provided with transverse markings corresponding to their respective zero scale indications, whereby speedy resetting of the two belts to their juxtaposed zero setting is facilitated.

11. The combination defined in claim 8, with
(F) said second belt being a narrow belt looped inside a wider first belt,
(G) a dual roller
(1) having two drum portions joined by a reduced shaft portion
(2) positioned inside depending portions of said belts,
(H) and a single hollow roller
(1) positioned between said drum portions
(2) surrounding said reduced shaft portion
(3) and suspended inside the depending portion of said shorter second belt,
whereby said belts are centered and independently tensioned by said dual roller and said single hollow roller respectively.

12. An indicator including first and second endless belts and means constraining said belts to advance coordinately across a viewing region, said first endless belt having a longitudinally distributed sequence of mutually different indicia each of which is located a uniform distance from the next along said first endless belt, said second endless belt having a longitudinally extending obscuring band disposed against the indicia of said first endless belt in said viewing region, said obscuring band being interrupted and having a gap of limited extent to display only one of said indicia at any one time, the lengths of said first and second endless belts differing by said uniform distance multiplied by a small integer, and said second endless belt having a longitudinally distributed sequence of mutually different indicia displayed successively at the viewing region, so that an indicium of said first endless belt is displayed by said gap at the viewing region adjacent the indicia of said second endless belt once in a complete cycle of advance of said second belt and the indicium displayed by said gap changes successively in successive cycles of advance of said second endless belt across the viewing region.

13. An indicator including a sprocket and first and second endless belts, said sprocket and said endless belts respectively having teeth and formations cooperating with said teeth so that rotation of said sprocket advances said endless belts coordinately, said first endless belt having a plurality of sequences of indicia, each indicium of said plurality of sequences of indicia being located a uniform distance from the next adjacent indicia along said first endless belt, the indicia within each of said plurality of sequences of indicia being mutually different and being the same as and arranged in the same order as the indicia in all the others of said plurality of sequences of indicia, said endless belt having an obscuring band disposed against said indicia of said first endless belt and said obscuring band having as many interruptions constituting gaps as there are sequences of indicia on said first endless belt, each of said gaps being of limited extent to provide a viewing area for one of said indicia at any one time, the lengths of said endless belts differing by said distance multiplied by a small integer, and said second endless belt having a longitudinally distributed sequence of mutually different indicia displayed successively at said viewing region, so that, as said sprocket rotates, both of said endless belts advance across the viewing region and the impression is created of the same indicium of said first endless belt being displayed at said viewing region adjacent the indicia of said second belt as many times in any one complete cycle of advance of said second endless belt across the viewing region as there are sequences of indicia on said first endless belt, and the further impression is created of successive indicia in any one of said plurality of sequences of indicia of said first endless belt being displayed during successive cycles of advance of said second endless belt.

14. An indicator including first and second endless belts and means for advancing said first and second endless belts coordinately across a viewing region, said first endless belt having four sequences of indicia disposed in succession therearound, each of the indicia constituting said four sequences of indicia being located a uniform distance from the next indicium along said first endless belt, each indicium of any one sequence of indicia being different from all the other indicia of that one sequence of indicia, said four sequences of indicia being alike in the number of indicia therein and the order thereof, except that the fourth of said four sequences of indicia lacks the last indicium present in the other three of said four sequences of indicia, said second endless belt having masking means overlying and concealing in the viewing region said indicia constituting said four sequences of indicia except that said masking means has four gaps spaced apart equally along said second endless belt, said gaps constituting windows and being of an extent to expose only one of said indicia at any one time, said first endless belt being shorter than said second endless belt by said uniform distance, and said second endless belt having a longitudinally distributed sequence of mutually different indicia adjacent to said masking means and adjacent to said windows thereof and the latter sequence of indicia being advanced successively and in successive cycles across the viewing region by said advancing means, whereby the impresion is created that the same indicium of said first belt is exposed through said windows four times during any one complete cycle of advance of said second endless belt across said viewing region, and the further impression is created that the exposed indicium changes once in each successive complete cycle of advance of said second endless belt across the viewing region in accordance with the sequence of the indicia in any of said four sequences of indicia.

15. An indicator including first and second endless belts and means for advancing said first and second endless belts coordinately across a viewing region, said first endless belt having four sequences of indicia disposed therearound, each of the indicia constituting said four sequences of indicia being located a uniform distance from the next indicium along said first endless belt, each indicium of any one sequence of indicia of said four sequences of indicia being different from all the other indicia of that one sequence of indicia, said four sequences of indicia being alike in the number of indicia therein and in the order thereof, except that two of said four sequences of indicia lack the last indicium present in the other two of said four sequences of indicia, said second endless belt having masking means overlying and concealing in the viewing region said indicia constituting said four sequences of indicia except that said masking means has four gaps spaced apart equally along said second endless belt, said gaps constituting windows and being of an extent to expose only one of said indicia at any one time, said first endless belt being shorter than said second endless belt by twice said uniform distance, and said second endless belt having a longitudinally distributed sequence of mutually different indicia adjacent to said masking means and adjacent to said windows thereof and the latter sequence of indicia being advanced successively and in successive cycles across the viewing region by said advancing means, said four sequences of indicia being interspersed so that the impression is created that the same indicium of said first belt is exposed through said windows four times during any one complete cycle of advance of said second endless belt across said viewing region, and the further impression is created that the exposed indicium changes once in each successive complete cycle of advance of said second endless belt across the viewing region in accordance with the sequence of the indicia in any of said four sequences of indicia.

16. An indicator including first and second endless belts, means for supporting said first and second endless belts and for insuring the coordinate advance thereof across a viewing region, said first endless belt having duplicate side-by-side sequences of indicia, the indicia of each of said duplicate side-by-side sequences of indicia being mutually different and having an increasing order, and being longitudinally distributed along said first endless belt, and the indicia of both of said duplicate side-by-side sequences of indicia increasing in the same direction around the first endless belt, each indicium of each of said duplicate side-by-side sequences of indicia being located a uniform distance from the next indicium in its respective sequence, said second endless belt having an obscuring band disposed against said sequences of indicia of the first endless belt in the viewing region, said obscuring band being interrupted so as to constitute a gap, the extent of such gap being limited to display only one indicium of each of said duplicate side-by-side sequences of indicia, the lengths of said first and second endless belts differing by said uniform distance multiplied by a small integer, said second endless belt also having duplicate sequences of mutually different indicia and the latter sequences of indicia being disposed adjacent to the respective sequences of indicia of said first endless belt and the duplicate sequences of indicia of said second endless belt increasing in the direction of increase of said duplicate sequences of indicia of said first endless belt, said first and second belts being of light-transmitting material and said supporting means having obscuring means for one of the duplicate sequences of indicia of each of said first and second endless belts, the first and second endless belts being selectively positionable with either one or the other of said duplicate sequences of indicia thereof in cooperation with said obscuring means so that the sequences of indicia of said first and second endless belts, respectively, which are not obscured by said obscuring means increase in one direction or in the opposite direction in dependence on the selective positioning as aforesaid of said first and second endless belts in relation to said supporting means.

17. An indicator in accordance with claim 28 wherein said first-named means comprises a sprocket having light and dark encircling bands underlying said duplicate sequences of indicia of both said first and second endless belts in the viewing region, said light band underlying one of said duplicate sequences of indicia of each of said first and second endless belts for effective display thereof and said dark band underlying the other of said duplicate sequences of indicia of each of said first and second endless belts for obscuring said other sequences of indicia.

18. An indicator including a belt having two side-by-side sequences of indicia increasing in the same direction along the belt, the portion of the belt bearing said indicia being of light-transmitting material, and a supporting member for said belt having light and dark portions underlying said sequences of indicia, respectively, in a viewing region, said belt being reversible relative to the light and dark portions of said supporting member whereby the dark portion selectively obscures one of said sequences of indicia while the sequence of indicia overlying said light portion is displayed thereby and increase selectively in one direction or the opposite direction in dependence on the selective disposition of said belt on the supporting member.

References Cited by the Examiner

UNITED STATES PATENTS

| | | | |
|---|---|---|---|
| 1,734,068 | 11/29 | Ziola | 116—124.5 |
| 2,376,100 | 5/45 | Turrettini | 77—4 |
| 2,958,136 | 11/60 | Anderson | 33—166 |

FOREIGN PATENTS 451,146  7/36  Great Britain.

LOUIS J. CAPOZI, *Primary Examiner.*